March 17, 1964     R. D. SMITH     3,125,314
SAFETY EQUIPMENT FOR AIRCRAFT OF ALL TYPES
Filed Oct. 17, 1962     2 Sheets-Sheet 1
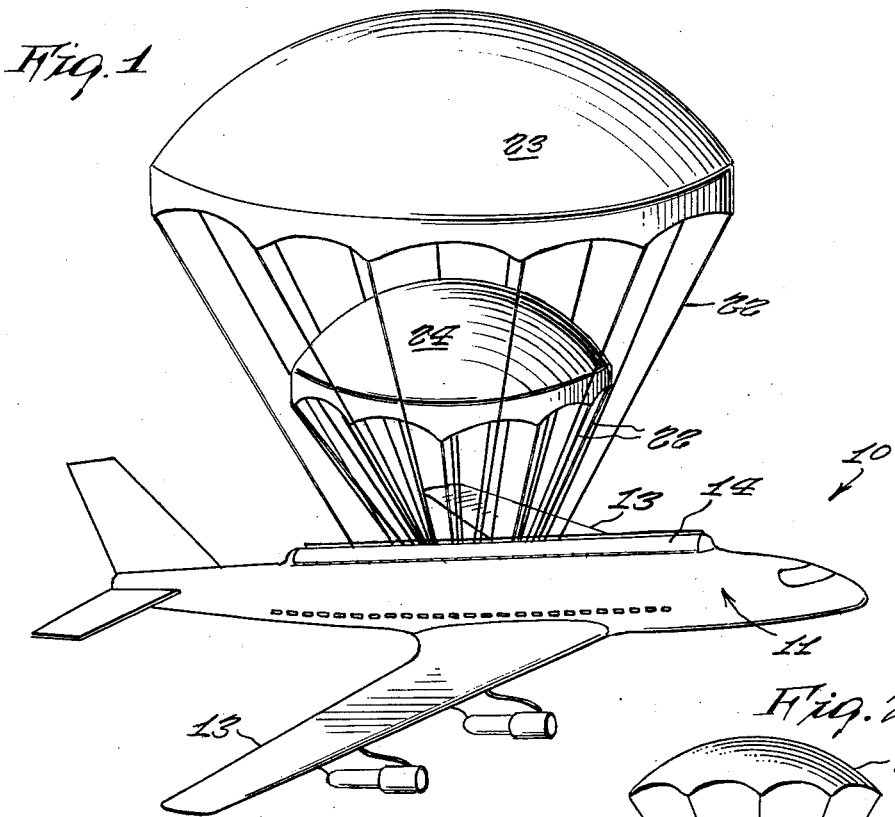
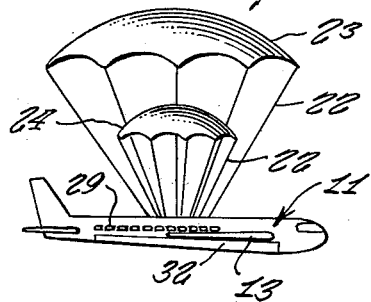
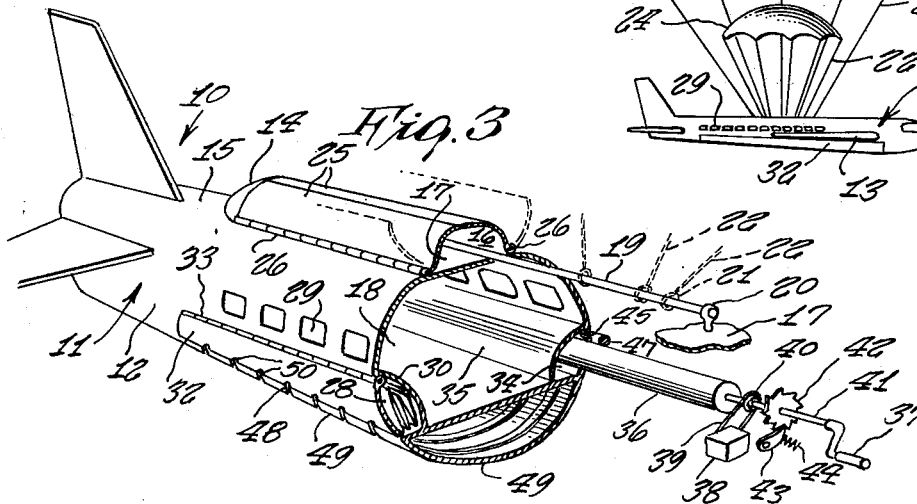
INVENTOR.
ROBERT D. SMITH

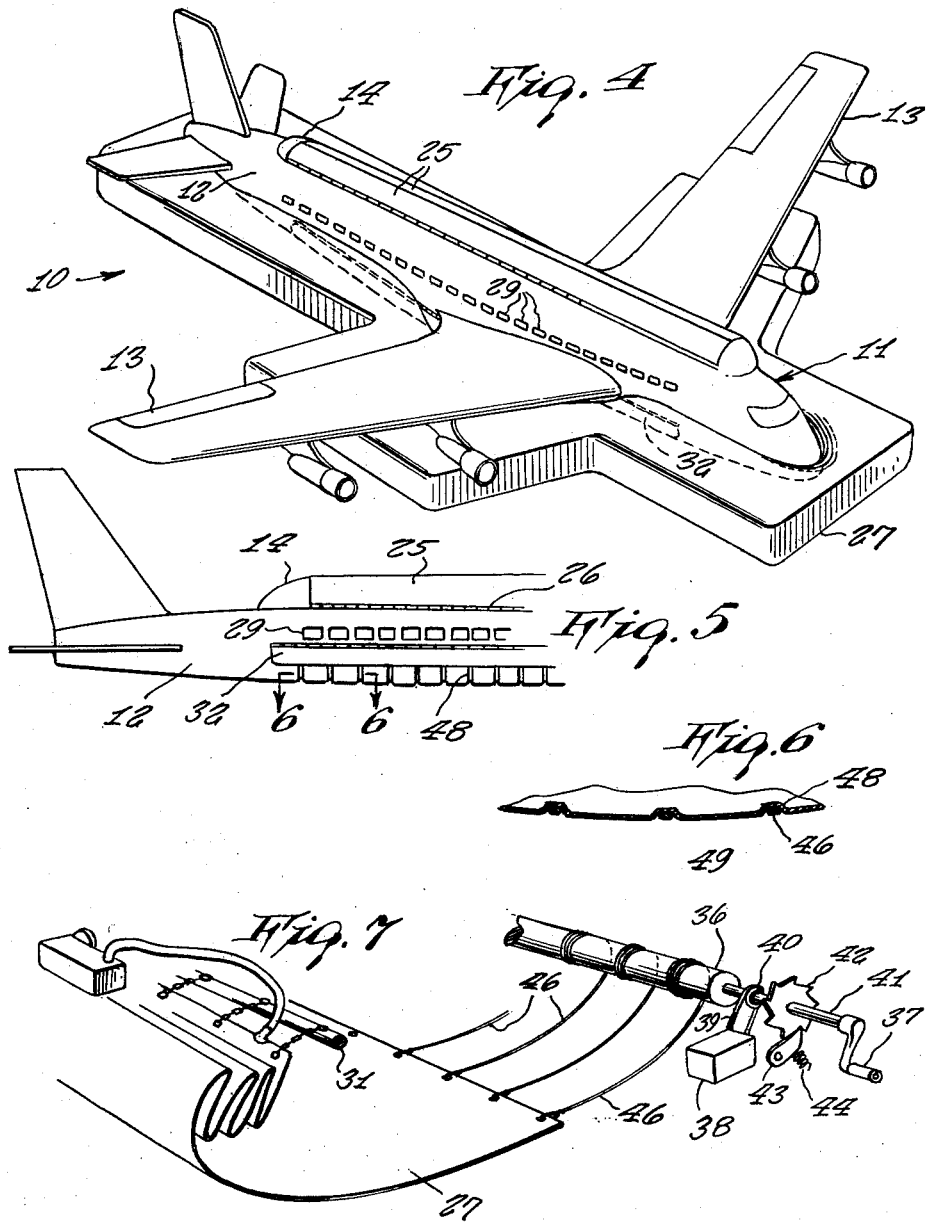

and Patent Office
3,125,314
Patented Mar. 17, 1964

3,125,314
SAFETY EQUIPMENT FOR AIRCRAFT OF ALL TYPES
Robert D. Smith, 2742 E. Tremont Ave., Bronx 61, N.Y.
Filed Oct. 17, 1962, Ser. No. 231,139
3 Claims. (Cl. 244—107)

This invention relates generally to safety devices for airplanes. More specifically it relates to self-contained braking devices to prevent sudden fall of an aircraft and cushioning devices for absorbing shock upon emergency impact with the ground.

One object of the present invention is to provide an airplane having self-contained means for braking a rapid fall of a disabled aircraft toward earth, thereby preventing the destruction thereof and loss of lives of passengers thereon.

Another object of the present invention is to provide an airplane having braking means which will maintain the aircraft in the proper horizontal position.

Still another object of the present invention is to provide an airplane having self-contained cushioning means for absorbing shock upon emergency impact with the earth and which will provide flotation means for the aircraft, should it fall into the sea, thus preventing loss of the plane and drowning of passengers and personnel.

A further object of the present invention is to provide means whereby a shock or flotation cushion can be drawn into operative position under the craft, while the craft is still in flight.

Other objects of the invention are to provide an aircraft as above described which will be of simple construction, have a minimum number of parts, is inexpensive to manufacture and efficient in operation and use.

These and other objects will be readily apparent upon a review of the following specification and the accompanying drawings wherein:

FIGURE 1 is a perspective view of an airplane shown incorporating the braking portion of the present invention;

FIG. 2 is a side elevational view of a modified form thereof;

FIG. 3 is a fragmentary perspective view in cross section of an airplane showing the invention in greater detail;

FIG. 4 is a perspective view of an aircraft shown incorporating the shock and flotation portion of the present invention;

FIG. 5 is a fragmentary side elevational view of an airplane incorporating both braking and shock and flotation means;

FIG. 6 is an enlarged cross section through lines 6—6 of FIG. 5; and

FIG. 7 is a fragmentary perspective view of part of the cushion and flotation means.

Referring now to the drawing in detail the numeral 10 represents and airplane incorporating the safety equipment according to the present invention wherein there is an aircraft 11 having a longitudinal fuselage member 12 and wing members 13.

As shown in FIGURES 1, 3 and 4, the fuselage may be provided with an upwardly extending bulge 14 which extends longitudinally along the upper side 15 thereof. This bulge encloses a compartment 16 separated by a bottom wall 17 from the cabin 18 within the fuselage.

Within the compartment there is a longitudinally extending rod 19 which is anchored at its ends and at intermediate points upon stanchions 20 affixed to the wall 17 and the framework of the airplane. Along the rod there are a plurality of rings 21, to each of which there is attached a shroud 22 connected to one of two parachutes 23 and 24 which are compactly stored within the compartment.

The bulge 14 is provided with a pair of mating doors 25 which extend the length of the bulge and which are pivotally supported on hinges 26 to open upwardly and sidewardly, as shown by the dotted lines in FIGURE 3. The doors are held in locked position by lock means which can be sprung into unlocked position by electrical means conveniently operated from the pilot's control panel.

Another element of the present invention is a shock or flotation cushion 27, shown in inflated operative position in FIGURE 4, and shown in collapsed folded position in FIGURES 3 and 7.

As shown in FIGURE 3 the fuselage has a compartment 28 on one side below the windows 29 and separated from the cabin by a wall 30. Within the compartment there is a longitudinally extending rod 31 to which there is affixed one end of the air cushion 27 which is stored in folded collapsed position within the compartment. A longitudinal door 32 provided on the outer side of the fuselage is pivotally supported on a hinge 33 immediately below windows 29. The door is secured by a lock which is electrically operated for release by remote control from a convenient control panel located anywhere.

Upon the opposite side of the fuselage there is a compartment 34 separated from the cabin by means of a wall 35. Within the longitudinal compartment there is a long drum 36 supported at its opposite ends (not shown). The drum is provided with rotation means which may be manually or motor operated, as shown in FIGURE 3, wherein there is a crank handle 37 and a motor 38 driven by means of belt 39, a pulley 40 on drum shaft 41.

A ratchet wheel 42 and a pawl 43 depressed by a spring 44 will prevent return rotation of the drum upon release of the crank handle or stoppage of the motor.

A plurality of openings 45 are provided in the fuselage wall which communicate with the compartment 34, and a flexible strong cord 46 (see FIGURE 7) extend therethrough. One end of each of the cords is affixed to the drum and the other end extends out of the opening 45 over a rod 47, then within a groove 48 under the bottom side 49 of the fuselage, then through a notch 50 on the lower edge of door 32 into compartment 28 where the terminal end of the cord is attached to the end of the folded cushion, this end being opposite the end affixed to the rod 31.

As shown in FIGURE 6 the grooves are of sufficient depth to hold the cords therein and prevent the cord from extending outwardly beyond the fuselage surface, thus not impairing the streamline of the craft. The grooves further aid in maintaining the cords in the correct position for operative use.

It is to be noted that the air blanket is wider at the edges around the craft than it is high, thus providing more stability in rough seas.

In operative use, when an aircraft is in danger of an uncontrolled fall to earth or into the sea, the pilot activates manually an electric switch which unlocks the longitudinal doors on the bulge. The doors thus opened, the first of two parachutes is immediately released into the atmosphere. Should the parachute fail, a second parachute released immediately thereafter would take over the responsibility of supporting the craft. Under perfect discharge, both parachutes will support the craft as shown in FIGURES 1 or 2, the craft being supported in a perfectly level position, due to the shrouds being connected to various longitudinal positions along the rod 19. Immediately prior to contact with the land or sea surface, the parachutes are cut loose from the airplane by means of locks which release the stanchions from the bottom, the locks being controlled from the pilot's control panel.

When it is desired to provide a cushion to absorb a shock of an emergency landing on ground (such as when the wheel carriage is crippled or locked within the housing), the lock on door 32 is released by the pilot and the drum 36 is rotated to wind up cord 46 causing cushion 27 to be drawn out of compartment 28 to the underside of the craft. An air hose permanently coupled to the cushion is attached to an air compressor which is then actuated by the pilot and the cushion is inflated. The cushion when fully inflated may be of a shape, as suggested in FIGURE 4, wherein side portions extend under the aircraft wings thereby offering greater protection in case the craft comes to land in a sideward, dipping position.

If it is necessary to land upon the surface of the sea, the side portions will provide greater stability against rolling on the waves. It is understood that the cushion is made of a strong, flexible rubberized fabric enclosing an inflatable central compartment which may be preferably bulkheaded with partitions to assure greater safety in case of leakage at sea. The air pressure in the upper compartments of the cushion would be made greater than in the lower compartments for greater stability. The cushion or air blanket serves as a boat carrying the aircraft thereupon.

A further use of the present invention can be made to permit airplanes to be intentionally landed on the sea, not for emergency purposes but for reasons of their own, such as meeting with a ship at mid-ocean or the like. In such cases the parachute system would not be operated at all. Only the air blanket system below the fuselage would be operated.

While various changes may be made in the detail construction, it shall be understood that such changes shall be within the spirit and scope of the present invention as defined by the appended claims.

Having thus set forth and disclosed by invention, I claim:

1. In an airplane, the combination with a fuselage and wings, a safety device comprising an inflatable foldable air blanket, means for storage of said blanket within said fuselage and means for extending said blanket under the lower side of said fuselage, said fuselage having a longitudinal first compartment on one side within said fuselage, said blanket being stored in folded position within said first compartment, a hinged door on the outer side of said first compartment, a second compartment on the opposite side of said fuselage, a rotatable drum mounted within said second compartment, means for rotating said drum, said blanket having one edge thereof affixed to a longitudinal rod within the said first compartment, the opposite edge of said blanket being attached to a plurality of cords, said cords extending out of said first compartment under said door, said cord passing under the underside of said fuselage and through a plurality of openings in the opposite side of said fuselage into said second compartment, the ends of said cords being attached to said drum.

2. In an airplane the combination as set forth in claim 1 wherein said safety device includes means for inflating said blanket when in a position under said fuselage.

3. In an airplane the combination as set forth in claim 2 wherein said underside of said fuselage includes a plurality of transverse grooves, each of said cords extending within each of said grooves.

References Cited in the file of this patent
UNITED STATES PATENTS
1,569,391    Pearl et al. _____ Jan. 12, 1926
FOREIGN PATENTS
118,729    Great Britain _____ Sept. 12, 1918